United States Patent [19]

Heuze

[11] 4,204,229

[45] May 20, 1980

[54] VIDEO CONTRAST EXPANDING ARRANGEMENT

[75] Inventor: Philippe Heuzé, Paris, France

[73] Assignee: Thomson-CSF, Paris, France

[21] Appl. No.: 952,126

[22] Filed: Oct. 17, 1978

[30] Foreign Application Priority Data

Oct. 21, 1977 [FR] France .............................. 77 31740

[51] Int. Cl.² .............................................. H04N 5/52
[52] U.S. Cl. ...................................... 358/169; 358/174
[58] Field of Search ................................ 358/174, 169

[56] References Cited

U.S. PATENT DOCUMENTS 3,569,620  3/1971  Baun ...................................... 358/174

Primary Examiner—Richard Murray
Attorney, Agent, or Firm—Cushman, Darby & Cushman

[57] ABSTRACT

An arrangement which enables a contrast range to be defined for the video signal between two adjustable potential levels and thus an increase in contrast to be obtained when the signal intended for an image display varies within a more restricted range. It comprises inserted in the video chain, a circuit for aligning the video signal to a first potential level and an automatic gain control circuit which receives the output of the aligning circuit and performs a complementary alignment to the second potential level. Each circuit includes a loop which responds with a determined time-constant to the respective peak variations in the signal in the course of at least an image scan period.

11 Claims, 5 Drawing Figures

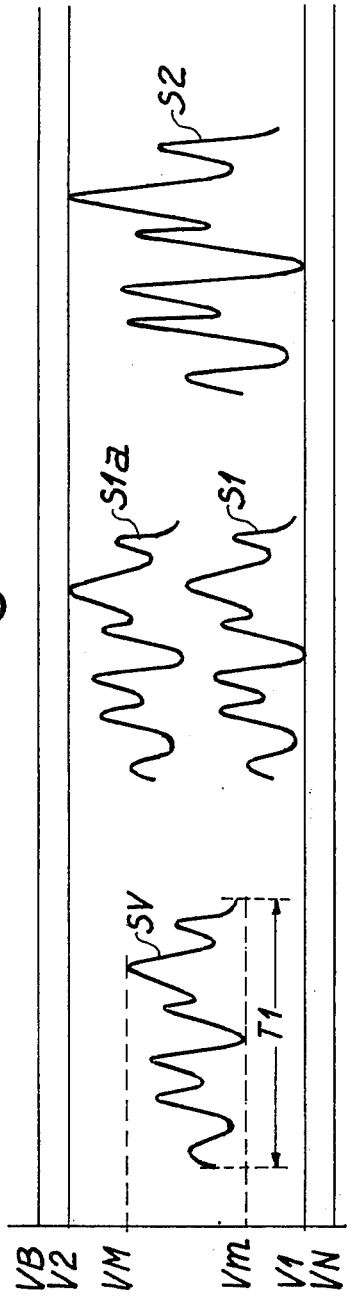
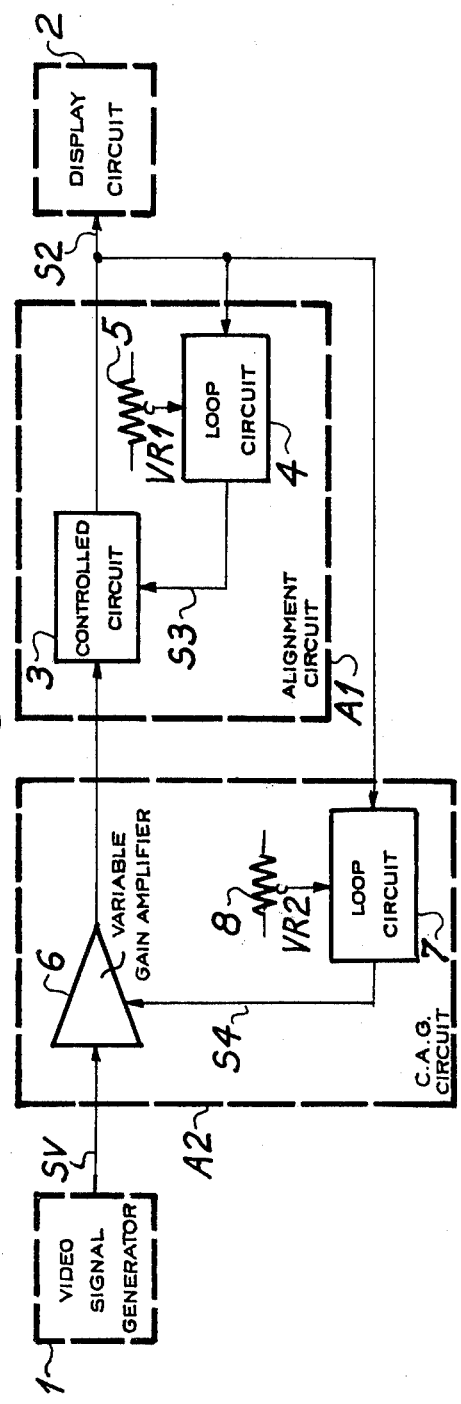

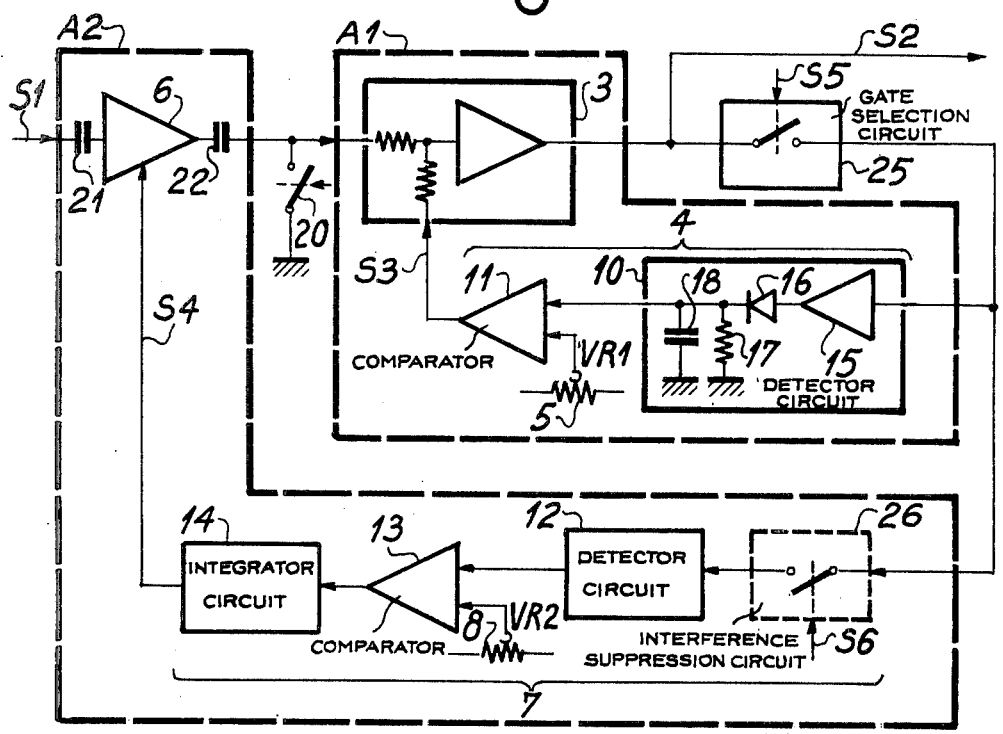
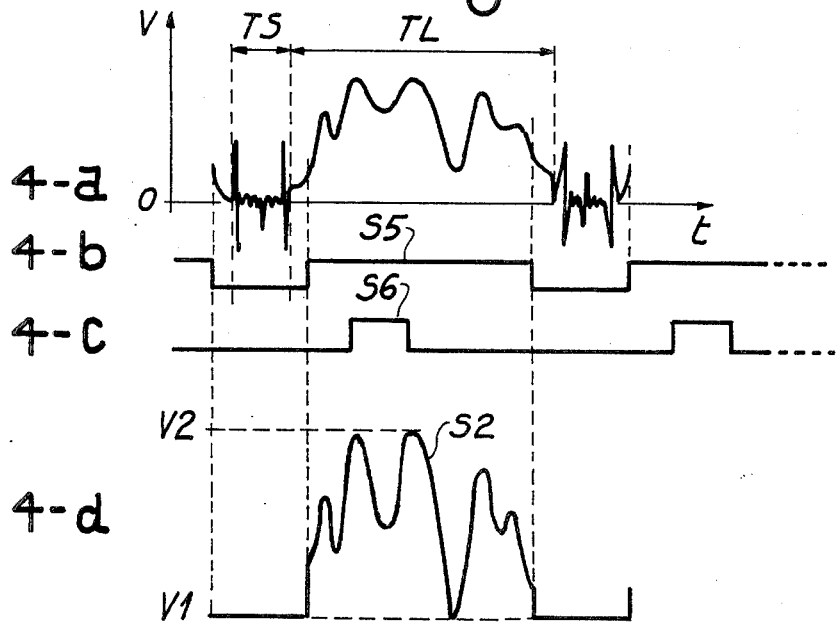

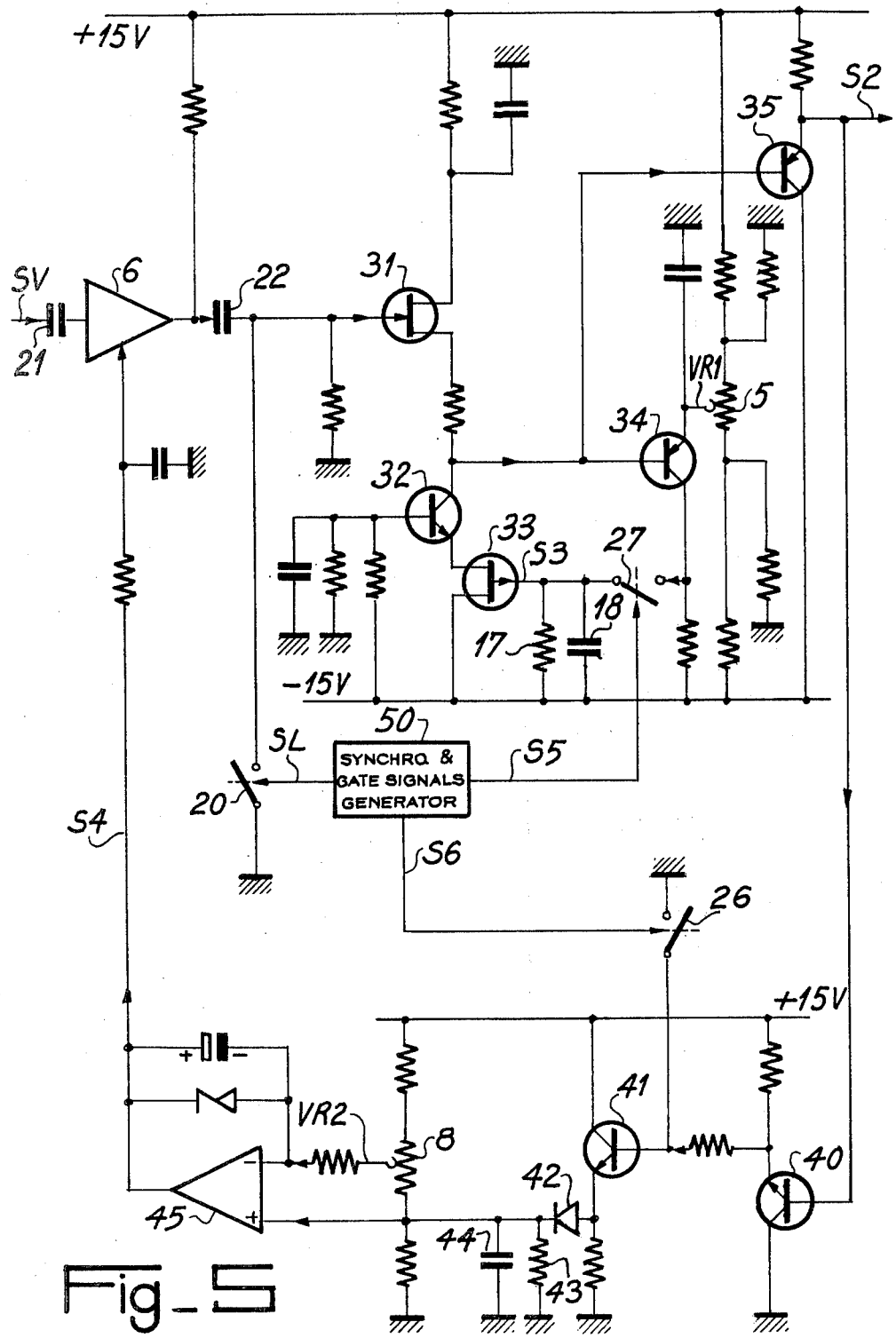
Fig_5

VIDEO CONTRAST EXPANDING ARRANGEMENT

The present invention relates to an arrangement for expanding video contrast. The invention is applicable to the processing of video signals which recur cyclically with similar characteristics such as, in particular, signals intended for an image display of the television type which remain virtually unaltered in the course of a plurality of successive frames, the frame duration generally being 1/50th or 1/60th of a second.

In conventional black and white television systems the receiver contains in the video chain a fixed-gain amplifier followed by a clamping circuit, the gain of the amplifier being so defined as to produce at its output a video signal of a predetermined level, such as 0.7 volts for example, for a nominal level of input signal, assuming this nominal level to correspond to the white level and the zero level to the black level. This video processing circuit, which preceeds the CRT display device, is unslaved and the level of the output signal varies linearly with that of the input signal received by the fixed-gain amplifier. The clamping circuit causes the black level to correspond to the level representing the pick up tube being blocked.

Certain applications based on use of the contrast in the video signal do not require the true shades to be preserved in the image displayed and it is therefore not necessary to have a processing circuit whose response characteristic is linear. When the image of the observed scene is picked up under unsatisfactory conditions, for example through mist, fog or clouds, colours are toned down and the contrast compressed. The amplitude of the useful modulation of the video signal, which is able to vary in an overall range lying between a minimum level corresponding to black and a maximum level corresponding to white, will, under such conditions, cover a more limited range of greys. It can be said that the signals then have a low dynamic.

Contrast compression phenomena of this kind are a disadvantage in these applications, as for example, to video contrast tracking systems.

It is known to operate by detecting the peak black and the white levels of the video signal, the black level which is detected being used to align the signal with the 0 volt reference level before it is applied to an amplifying circuit whose gain is controlled by the white level which is detected. An arrangement of this kind for the automatic control of video contrast has a number of disadvantages, namely the need for alignment to the black level of 0 volts owing to the fact that the alignment to the black level takes place before the automatic gain control comes into action, and a contrast expansion which varies due to the fact that the alignment to the white value is independent of the black level detected, and thus a range of expansion which is unstable and non-adjustable.

The object of the invention is to provide an arrangement for expanding the contrast of video signals having a low dynamic which overcomes the deficiences mentioned, by extending the range of shades contained in the image in a predetermined and adjustable contrast range which, at its maximum extend, covers the entire range between white and black.

In accordance with the invention, there is provided an arrangement for expanding the contrast of a video signal intended for an image display by extending the signal in a contrast range defined between a first and a second potential level, comprising: means for aligning the video signal with the first level which are formed by an aligning circuit which is inserted in the video chain via a first input and an output and which receives at a second input a first control signal produced by first detecting circuit, and means for aligning the video signal with the second level which are connected to the output of the aligning circuit and which are formed by an automatic gain control (AGC) circuit which is inserted in the video chain via a first input and an output and which receives at a second input a second control signal produced by a second detecting circuit, the control signals being a function of the peak variations in the video signal relative to respective ones of the alignment levels, the said detecting circuits each forming part of servo loop circuits which supply the respective control signals, a first loop circuit being connected between the second input and the output of the aligning circuit and the second loop circuit being connected between the second input of the AGC circuit and a point of connection to the video chain corresponding to the output of the arrangement.

The invention will now be further described with reference to the accompanying drawings which show:

FIG. 1, waveforms illustrating the method employed,

FIG. 2, a general diagram of a contrast expanding arrangement according to the invention, FIG. 3, a detailed diagram of the contrast expanding arrangement as applied to processing a television video signal, FIG. 4, signal waveforms relating to the operation of the arrangement shown in FIG. 3, FIG. 5, an embodiment of contrast expanding arrangement according to the invention.

The method employed is illustrated by the waveforms in FIG. 1. The video signal SV to be processed is observed for a predetermined period T1 at least equal to the duration of one scan of the display screen, that is to say one frame in the case of a line-by-line scan of the television type. V1 and V2 are the levels which define the contrast range in which it is desired that the contrast of the video signal should lie. As will be seen, this range may be adjusted between limiting values VN and VB which correspond respectively to the display level for black, which is generally situated at the zero reference potential, and to the display level for white. The arrangement produces the signal S2 which is shown between the selected limits V1, and V2 and for this purpose proceeds in two stages, a first consisting in aligning the signal with one of the selected levels, either V1 (signal S1) or V2 (signal S1a), and the second in performing a complementary alignment with the second level by amplying the signal. Thus, when the video signal SV varies within a narrower contrast range than the intended range V1 to V2, such as for example between the minimum and maximum values Vm and VM which occur in the course of the period T1 in question, the arrangement brings about an expansion in the signal to move it out to the levels V1 and V2 and produce an increase in contrast. The expansion factor is automatically monitored by the arrangement so that any occasional excursions on the part of the peak values Vm and VM outside the set range V1 and V2 which subsequently occur are automatically absorbed.

The means which constitute the arrangement are shown schematically in the functional diagram of FIG. 2 and in greater detail in the diagram of FIG. 3. An ancillary block 1 situated upstream of the arrangement supplies the signal SV. It may comprise a video preamplifier, a vidicon tube, a charge-coupled circuit or CCD sensor, or again a television camera. The video signal SV may be composite, that is to say may incorporate synchronising signals, or non-composite.

The arrangement includes two assemblies of circuits A1 and A2 to perform respective ones of the two above-mentioned stages of alignment, the signal S1 (or S1a) resulting from the first alignment being fed through the second assembly to enable the desired final signal S2 to be obtained. The circuit assemblies A1 and A2 are preferably connected as shown, with assembly A1 downstream of assembly A2. The advantages of this arrangement will become apparent at a later stage. Each assembly comprises a first circuit which is inserted directly in the chain and which is controlled by a second circuit which forms a servo-loop.

Assembly A1 is responsible for the alignment of the video signal to one of the levels V1 and V2 by shifting it up or down the potential scale and the second assembly A2 is responsible for the alignment of the signal to the opposite level V2 (or V1) by amplification. The functions respectively performed are alignment by assembly A1 and automatic gain control by assembly A2.

The assembly A1, or aligning circuit, includes a loop circuit 4 in which the signal is processed by peak detection and comparison with a reference VR1 (circuits 10 and 11 in FIG. 3) to produce a control signal S3 which is applied to a circuit 3 connected in series in the video chain whose output supplies the input to the loop circuit 4. To achieve an instantaneous aligning action, signal S3 may be summed with the input signal at 3 (FIG. 3) or, to give another example, may act on the bias of an active member such as a transistor. Various embodiments are possible for this circuit. Reference VR1 is advantageously made adjustable by means of a member 5 which is represented by a potentiometer, to adjust the alignment level in question, V1 for example, to the desired operating level, the extreme limit of adjustment corresponding to level VN. The loop 4 has a response time-constant corresponding to the period T1 defined above, so that the value and the sign of signal S3 are a function of the difference between the alignment level V1 concerned and the minimum peak value Vm of the signal in the course of the period T1 preceding the time concerned. The signal is thus automatically aligned with the level V1 in question with a delay corresponding to period T1, which is acceptable given the repetitive nature of the signal in the course of successive image scans.

The assembly A2, or automatic gain control circuit, is formed in a similar fashion, the series circuit 6 being a variable gain amplifier which is controlled by the signal S4 supplied by a loop circuit 7. A reference signal VR2, which is adjustable by means of a member 8, enables the second alignment level, V2 in the present case, to be fixed. The response time-constant of the loop 7 is likewise determined in relation to the period T1 to give a control signal S4 which is a function of the difference between level V2 and the maximum peak value VM which occurs in the course of this period. An integrating circuit 14 is provided at the output of the loop circuit 7 following the detection circuit 12 and the circuit 13 for performing a comparison with reference VR2. The integrating circuit 14 enables the change in the gain of the amplifier 6 to be brought about gradually by the output signal S4.

The detecting circuit 12 in assembly A2 may be a peak detector as in the case of circuit 10 in assembly A1 but this is not essential and circuit 12 may be designed to detect the mean value of the signal or may be adjusted to detect a given value between the peak value and the mean value. In all cases threshold level VR2 set at 8 enables the gain of the loop to be adjusted to obtain the complementary alignment to level V2. The peak detecting circuit 10 is shown diagrammatically in FIG. 3 as a buffer amplifier 15 which supplies the signal with the desired polarity, a detecting diode 16 and a memory circuit represented by a resistance/capacitance network 17, 18. The charge in the capacitor 18 corresponds to the peak value detected, it being understood that the charging time-constant is shorter than the discharge time-constant, the latter being adjusted in particular by means of the value selected for the parallel resistor 17. Circuit 10 affects mainly the value of the response time-constant of the loop 4 and the same also applies to the detecting circuit 12 in loop 7 with the additional effect due to the integrating circuit 14.

The output signal S2 produced by the arrangement is transmitted to downstream circuits comprising a cathode ray tube display device, these circuits being represented by block 2 in FIG. 2.

The preference is for assembly A1 to be connected downstream of assembly A2 in the video chain because this has considerable advantages as compared with the other possible layout consisting in connecting the assemblies in cascade. A first advantage results from the fact that assembly A1 benefits from the amplification provided by the variable gain amplifier circuit 6 and a second advantage is that the alignment of the output signal S2 to the first potential level is automatically maintained and is not subject to fluctuation given that this signal is applied to both loops at once and is processed simultaneously by the two assemblies A1 and A2 rather than in succession as would occur with a series layout.

In an application to a television video signal intended to be displayed by the line-by-line scan method, the video chain includes, as mentioned in the preamble, a clamping circuit which resets the D.C. component at the line frequency. The input and output connections of the variable gain amplifier 6 are capacitive channels and are represented by members 21 and 22 in FIG. 3. Consequently, the clamping circuit 20 is preferably positioned at the output of amplifier 6 between assemblies A2 and A1 (FIG. 3). In cases where the coupling capacitors 21 and 22 are of high value it would be possible for the clamping circuit 20 to be connected upstream. The signal obtained at the output of the clamping circuit 20 is shown in FIG. 4a. It comprises useful modulation during the line scan period TL and interference signals during the line blanking period TS corresponding to the fly-back. It is necessary to add to the chain interference suppression circuits so that this interference does not upset the operation of the arrangement by being applied to the inputs of loops 4 and 7. FIG. 3 contains such an addition and the suppression circuit may consist of a switch circuit 25 which is fed with output signal S2 and which supplies loops 4 and 7. When connected in series, circuit 25 is caused to close by period square waves S5 (FIG. 4b) corresponding to the periods of useful modulation during which the signal is looked at. The length of a square wave S5 is preferably made slightly shorter than the period TL so that the switch overruns the line blanking period TS on either side. FIG. 4d shows the output signal from the suppression circuit 25.

A second switch circuit 26 may be provided in the channel which feeds loop 7 to define a gate within which the expansion of video contrast takes place, this expansion not occuring throughout the whole of the image. The AGC gate circuit 26 is controlled by a signal S6 (FIG. 4c) similar to signal S5, the duration of the square wave corresponding to the width of the gate and the square wave being produced in the course of those lines which correspond to the height of the gate in the course of each frame.

Signals S5 and S6 are produced by an ancillary circuit (not shown) from the line synchronisation signal. If it is also desired that the residual part of the image lying outside the gate should be ignored as far as alignment is concerned, an additional gate circuit may be arranged at M at the input to loop 4 and may be controlled in synchronism with circuit 26. In this case circuit 25 serves no purpose and may be dispensed with.

FIG. 5 shows an embodiment of contrast expanding arrangement based on the detailed diagram in FIG. 3. The aligning circuit A1 comprises a field effect transistor 31 whose source electrode bias is controlled by a variable resistance circuit comprising a transistor 32 and a field effect transistor 33 whose gate electrode is at the potential of a capacitor 18. The peak detection and comparator section is formed by a transistor 34 whose reference potential VR1 to the emitter is adjusted by a potentiometer 5. An interference suppression gate circuit 27 is arranged between the detection output and the memory circuit 18, 17. An output transistor 35 is connected as a buffer stage. The automatic gain control loop comprises a transistor 40 connected as a buffer stage, a AGC gate circuit 26, a transistor 41 connected as a buffer amplifier stage, a detecting diode 42, a memory circuit 43, 44 and a operational amplifier 45 connected as an integrator. A potentiometer 8 enables the reference level VR2 to be adjusted. A circuit 50 produces control signals comprising: a line synchronisation signal SL for circuit 20 and the square waves S5 and S6 intended for the switch circuits 27 and 26.

What is claimed is:

1. Arrangement for expanding the contrast of a video signal intended for an image display, by extending the signal in a contrast range defined between a first and a second potential level, comprising: means for aligning the video signal with the first level which are formed by an aligning circuit which is inserted in the video chain via a first input and an output and which receives at a second input a first control signal produced by a first detecting circuit, and means for aligning the video signal with the second level which are connected to the output of the aligning circuit and which are formed by an automatic gain control (AGC) circuit which is inserted in the video chain via a first input and an output and which receives at a second input a second control signal produced by a second detecting circuit, the control signals being a function of the peak variations in the video signal relative to respective ones of the alignment levels, the said detecting circuits each forming part of servo loop circuits which supply the respective control signals, a first loop circuit being connected between the second input and the output of the aligning circuit and the second loop circuit being connected between the second input of the AGC circuit and a point of connection to the video chain corresponding to the output of the arrangement.

2. Arrangement according to claim 1, wherein the means for aligning to the second level are connected in the video chain upstream of the means for aligning to the first level, the video signal being applied to the first input of the AGC circuit which is connected in series with the aligning circuit, whose output feeds the said two loop circuits simultaneously.

3. Arrangement according to claim 2, wherein each loop circuit comprises a detection circuit in series with a comparison circuit which enables the detected signal to be compared with an adjustable reference signal and the corresponding alignment level, and thus the range of contrast expansion, to be adjusted.

4. Arrangement according to claim 3, wherein each detecting circuit comprises a diode which feeds a memory circuit formed by a resistance/capacitance network, the comparison circuit receiving the appropriate reference signal at one input and the signal at the terminal of the capacitor in the corresponding memory circuit at a second input.

5. Arrangement according to claim 4, wherein the AGC circuit comprises a variable gain amplifier controlled by the second loop circuit, the said second loop circuit also including an integrating circuit which supplies the said second control signal to the variable gain amplifier.

6. Arrangement according to claim 2, wherein the aligning circuit is formed by a current generating circuit constituting a variable resistance circuit which is positioned in one electrode connection of a field effect transistor inserted in the video chain.

7. Arrangement according to claim 2, wherein it includes at least one switch circuit which is inserted in a loop circuit and which is controlled to bring about an expansion of contrast in a defined part of the image.

8. Arrangement according to claim 2 and applied to processing a video signal intended for image display on a cathode ray tube using a line-by-line scanning mode of the television type, wherein it includes a switch circuit in the supply connection to the loop circuits so as to prevent the signal from being transmitted during the line blanking periods in which interference signals occur due to the blocking and unblocking of said tube.

9. Arrangement according to claim 1, wherein the means for aligning to the second level are connected downstream of the means for aligning to the first level, the video signal being applied to the first input of the aligning circuit, which is connected in series with the AGC circuit, whose output supplies the second loop circuit.

10. Apparatus for expanding the contrast of a video signal intended for an image display by extending the signal in a contrast range defined between first and second potential levels comprising:
   first means for aligning said video signal with said first potential level including an aligning circuit inserted into the video chain via a first input and an output which receives at a second input a first control signal produced by a first detecting circuit; and
   second means for aligning said video signal with said second potential level coupled to said output of said aligning circuit which includes an automatic gain control circuit coupled in the video chain via a first input coupled to said output of said aligning circuit and including an output and which receives at a second input a second control signal produced by a second detecting circuit, said aligning circuit further including a current generating circuit comprising a variable resistance circuit coupled to one electrode of a field effect transistor inserted in the video chain, said control signals being a function of the peak variation in the video signal relative to respective variations of the alignment levels, said detecting circuits each forming part of a servo loop circuit which supplies the respective control signals, a first loop circuit being defined by said second input and said output of said aligning circuit and said second loop circuit being defined by said second input of said AGC circuit and a point of connection to the video chain corresponding to the output of the apparatus, the video signal being applied to the first input of the automatic gain control circuit which is coupled in series with said aligning circuit, the output of which feeds said two loop circuits simultaneously.

11. Apparatus for expanding the contrast of a video signal intended for an image display by extending the signal in a contrast range defined between first and second potential levels comprising:

first means for aligning said video signal with said first potential level, said means for aligning including an aligning circuit coupled in the video chain via a first input and an output and which receives at a second input a first control signal produced by a first detecting circuit; and second means for aligning said video signal with said second potential level, said second means for aligning coupled to said output of said aligning circuit, said second means for aligning further including gain control circuit which is coupled in the video chain via a first input coupled to said output of said aligning circuit and having an output and which receives at a second input a second control signal produced by a second detecting circuit, said control signals being a function of the peak variation in the video signal relative to respective variation of the alignment levels, said detecting circuits each forming part of control loop circuits which supply the respective control signals, a first loop circuit being defined by said second input and said output of said aligning circuit, and said second loop circuit being defined by said second input of said automatic game control circuit and a point of connection to the video chain corresponding to the output of the apparatus, the video signal being applied to the first input of automatic gain control circuit which is coupled in series with said aligning circuit, the output of which feeds said two loop circuits simultaneously, and said apparatus further including at least one switch circuit inserted into one of said loops and which is controlled to bring about an expansion of contrast in a defined part of the image.

* * * * *